US008812269B1

(12) United States Patent
Orofino, II

(10) Patent No.: US 8,812,269 B1
(45) Date of Patent: *Aug. 19, 2014

(54) DYNAMIC RANGE ASSESSMENT IN BLOCK DIAGRAM SYSTEMS

(75) Inventor: Donald Paul Orofino, II, Sudbury, MA (US)

(73) Assignee: The MathWorks, Inc., Natick, MA (US)

( * ) Notice: Subject to any disclaimer, the term of this patent is extended or adjusted under 35 U.S.C. 154(b) by 1012 days.

This patent is subject to a terminal disclaimer.

(21) Appl. No.: 11/137,006

(22) Filed: May 24, 2005

Related U.S. Application Data

(63) Continuation-in-part of application No. 11/011,298, filed on Dec. 13, 2004.

(51) Int. Cl.
*G06F 17/50* (2006.01)
*G06F 9/44* (2006.01)

(52) U.S. Cl.
CPC ..................................... *G06F 8/34* (2013.01)
USPC .................. 703/1; 703/22; 714/731; 719/328

(58) Field of Classification Search
USPC ......... 717/105, 124, 125, 127, 130–132, 153, 717/167; 715/763, 764
See application file for complete search history.

(56) References Cited

U.S. PATENT DOCUMENTS

| 5,061,245 | A | 10/1991 | Waldvogel |
| 5,331,111 | A | 7/1994 | O'Connell |
| 5,946,485 | A * | 8/1999 | Weeren et al. ................. 717/109 |
| 6,064,409 | A | 5/2000 | Thomsen et al. |
| 6,226,787 | B1 | 5/2001 | Serra et al. |
| 6,282,699 | B1 | 8/2001 | Zhang et al. |
| 6,330,356 | B1 * | 12/2001 | Sundareswaran et al. .... 382/154 |
| 6,335,741 | B1 | 1/2002 | Nock |
| 6,412,106 | B1 * | 6/2002 | Leask et al. .................... 717/124 |
| 6,715,139 | B1 | 3/2004 | Kodosky et al. |
| 6,748,583 | B2 | 6/2004 | Aizenbud-Reshef et al. |
| 6,817,010 | B2 * | 11/2004 | Aizenbud-Reshef et al. 717/127 |
| 6,839,894 | B1 | 1/2005 | Joshi et al. |
| 6,971,065 | B2 | 11/2005 | Austin |
| 6,988,262 | B1 * | 1/2006 | Mallory et al. ............... 717/127 |
| 7,051,322 | B2 | 5/2006 | Rioux |
| 7,058,950 | B2 * | 6/2006 | Jeyaraman .................... 718/104 |
| 7,062,779 | B1 | 6/2006 | Courtney et al. |
| 7,072,801 | B2 | 7/2006 | James |
| 7,072,813 | B2 * | 7/2006 | Billemaz et al. .................. 703/6 |
| 7,076,740 | B2 | 7/2006 | Santori et al. |

(Continued)

FOREIGN PATENT DOCUMENTS

WO 99/09473 A1 2/1999

OTHER PUBLICATIONS

RedHawk NightStar Tools Version 1.1 Release Notes, pp. 1-17, Sep. 2002.*

(Continued)

*Primary Examiner* — Omar Fernandez Rivas
*Assistant Examiner* — Kibrom Gebresilassie
(74) *Attorney, Agent, or Firm* — Harrity & Harrity, LLP

(57) ABSTRACT

Remote monitoring tools are provided for non-intrusively and synchronously interacting with graphical models. The remote monitoring tools are dynamically connected to the graphical model without requiring the addition of components to the model definition. The remote monitoring tool can perform dynamic range assessment on the graphical model.

35 Claims, 10 Drawing Sheets

(56) References Cited

U.S. PATENT DOCUMENTS

| | | | |
|---|---|---|---|
| 7,134,090 B2 | 11/2006 | Kodosky et al. | |
| 7,171,653 B2* | 1/2007 | Albrecht | 717/124 |
| 7,185,315 B2 | 2/2007 | Sharp et al. | |
| 7,200,838 B2 | 4/2007 | Kodosky et al. | |
| 7,210,105 B2* | 4/2007 | Melamed et al. | 715/779 |
| 7,210,117 B2 | 4/2007 | Kudukoli et al. | |
| 7,215,270 B1* | 5/2007 | Kozak et al. | 341/143 |
| 7,302,675 B2* | 11/2007 | Rogers et al. | 717/125 |
| 7,302,676 B2* | 11/2007 | Schmitt et al. | 717/132 |
| 7,315,791 B2 | 1/2008 | Ilic et al. | |
| 7,325,210 B2* | 1/2008 | Rao et al. | 716/113 |
| 7,439,891 B2* | 10/2008 | Kozak et al. | 341/143 |
| 7,480,906 B2 | 1/2009 | Joffrain et al. | |
| 7,490,029 B2* | 2/2009 | Wasynczuk et al. | 703/17 |
| 7,512,931 B2 | 3/2009 | Schmit | |
| 7,568,017 B2 | 7/2009 | Shah et al. | |
| 7,813,825 B2* | 10/2010 | Dubowsky | 700/94 |
| 7,827,068 B2 | 11/2010 | Shah et al. | |
| 7,835,895 B1* | 11/2010 | Orofino et al. | 703/13 |
| 7,966,562 B1 | 6/2011 | Brewton et al. | |
| 7,996,513 B2 | 8/2011 | Gorman et al. | |
| 8,046,708 B1 | 10/2011 | Aldrich | |
| 8,423,326 B1* | 4/2013 | Astolfi et al. | 703/1 |
| 2002/0049934 A1* | 4/2002 | Anderson et al. | 714/45 |
| 2002/0052725 A1* | 5/2002 | Wasynczuk et al. | 703/22 |
| 2002/0054101 A1* | 5/2002 | Beatty | 345/764 |
| 2002/0070968 A1 | 6/2002 | Austin et al. | |
| 2002/0143857 A1* | 10/2002 | Bidarahalli et al. | 709/203 |
| 2003/0005180 A1 | 1/2003 | Schmit et al. | |
| 2003/0016206 A1 | 1/2003 | Taitel | |
| 2003/0037322 A1* | 2/2003 | Kodosky et al. | 717/162 |
| 2003/0046663 A1* | 3/2003 | Rogers et al. | 717/125 |
| 2003/0084127 A1 | 5/2003 | Budhiraja et al. | |
| 2003/0093239 A1 | 5/2003 | Schmit | |
| 2003/0107595 A1 | 6/2003 | Ciolfi | |
| 2003/0200076 A1 | 10/2003 | Kodosky et al. | |
| 2004/0031019 A1 | 2/2004 | Lamanna et al. | |
| 2004/0032429 A1 | 2/2004 | Shah et al. | |
| 2004/0034696 A1 | 2/2004 | Joffrain et al. | |
| 2004/0045009 A1* | 3/2004 | Bryant | 719/316 |
| 2004/0064750 A1 | 4/2004 | Conway | |
| 2004/0093197 A1* | 5/2004 | Billemaz et al. | 703/13 |
| 2004/0153997 A1* | 8/2004 | Anderson et al. | 717/127 |
| 2004/0205726 A1* | 10/2004 | Chedgey et al. | 717/125 |
| 2004/0210426 A1 | 10/2004 | Wood | |
| 2004/0210798 A1 | 10/2004 | Higashi | |
| 2004/0255269 A1 | 12/2004 | Santori et al. | |
| 2005/0144587 A1 | 6/2005 | Bryant | |
| 2005/0183098 A1 | 8/2005 | Ilic et al. | |
| 2006/0041859 A1 | 2/2006 | Vrancic et al. | |
| 2006/0053211 A1 | 3/2006 | Kornerup et al. | |
| 2006/0064670 A1 | 3/2006 | Linebarger et al. | |
| 2006/0111074 A1* | 5/2006 | Petilli et al. | 455/334 |
| 2006/0129371 A1* | 6/2006 | Orofino et al. | 703/22 |
| 2006/0184410 A1 | 8/2006 | Ramamurthy et al. | |
| 2006/0259870 A1 | 11/2006 | Hewitt et al. | |
| 2007/0143455 A1 | 6/2007 | Gorman et al. | |
| 2008/0007332 A1* | 1/2008 | Dubowsky | 330/129 |
| 2008/0028196 A1* | 1/2008 | Kailas | 712/245 |
| 2008/0098349 A1 | 4/2008 | Lin et al. | |
| 2008/0222620 A1* | 9/2008 | Little et al. | 717/149 |
| 2009/0012757 A1* | 1/2009 | Orofino et al. | 703/2 |
| 2009/0132993 A1* | 5/2009 | Mani et al. | 717/105 |
| 2009/0216546 A1* | 8/2009 | Huang et al. | 705/1 |
| 2010/0223564 A1 | 9/2010 | Hsu et al. | |
| 2011/0023019 A1 | 1/2011 | Aniszczyk et al. | |
| 2011/0214044 A1 | 9/2011 | Davis et al. | |
| 2012/0066762 A1 | 3/2012 | Todorovic | |
| 2013/0198527 A1 | 8/2013 | Lu et al. | |
| 2014/0053090 A1 | 2/2014 | Lu et al. | |
| 2014/0059525 A1 | 2/2014 | Jawa et al. | |
| 2014/0059573 A1 | 2/2014 | Jawa et al. | |

OTHER PUBLICATIONS

LabVIEW User Manual, National Instruments, Jan. 1998 Edition, pp. 1-514, Part No. 3209999B-01.*
NightSim User's Guide, Concurrent Computer Corporation, pp. 1-136, Sep. 2002.*
RedHawk Linux Real-Time Software Environment, Concurrent Computer Corporation, pp. 1-2, 2002.*
W. Mansor, Z. Awang, and M. Taib, "Software Methodology for Remote Monitoring and Control System" pp. 509-511, IEEE 2000.*
SIMULINK model-based and system-based design, Version 5, pp. i-xxii, 1-1 to I-18, 2002.*
Using Simulink Version 5, pp. 1-476, 2002.*
National Instruments, "LabVIEW, Graphical Programming for Instrumentation," User Manual, 34 pages, (1996).
International Search Report for PCT/US2005/045493, 4 pages, dated Apr. 25, 2007.
Summons to Attend Oral Proceedings for Application No. 05854256. 4, 14 pages, dated Nov. 28, 2012.

* cited by examiner

DYNAMIC RANGE ASSESSMENT IN BLOCK DIAGRAM SYSTEMS

CLAIM OF PRIORITY

This application is a continuation in part of Ser. No. 11/011,298 entitled "Tools for System-Level Design Environments" filed on Dec. 13, 2004.

FIELD OF THE INVENTION

The present invention relates to a system and method suitable for non-intrusively monitoring data synchronous with events in an executing block diagram or graphical model and more specifically on performing dynamic range assessment on the monitored data.

BACKGROUND OF THE INVENTION

Historically, engineers and scientists have utilized graphical models in numerous scientific areas such as Feedback Control Theory and Signal Processing to study, design, debug, and refine dynamic systems. Dynamic systems, which are characterized by the fact that their behaviors change over time, are representative of many real-world systems. Graphical modeling has become particularly attractive over the last few years with the advent of software packages, such as Simulink®, made by The MathWorks, Inc. of Natick Mass., LabVIEW®, made by National Instruments Corporation of Austin, Tex., and the like. Simulink® provides sophisticated software platforms with a rich suite of support tools that makes the analysis and design of dynamic systems efficient, methodical, and cost-effective.

A dynamic system (either natural or man-made) is a system whose response at any given time is a function of its input stimuli, its current state, and the current time. Such systems range from simple to highly complex systems. Physical dynamic systems include a falling body, the rotation of the earth, bio-mechanical systems (muscles, joints, etc.), bio-chemical systems (gene expression, protein pathways), weather and climate pattern systems, etc. Examples of man-made or engineered dynamic systems include: a bouncing ball, a spring with a mass tied on an end, automobiles, airplanes, control systems in major appliances, communication networks, audio signal processing, nuclear reactors, a stock market, etc.

Professionals from diverse areas such as engineering, science, education, and economics build mathematical models of dynamic systems in order to better understand system behavior as it changes with the progression of time. The mathematical models aid in building "better" systems, where "better" may be defined in terms of a variety of performance measures such as quality, time-to-market, cost, speed, size, power consumption, robustness, etc. The mathematical models also aid in analyzing, debugging and repairing existing systems (be it the human body or the anti-lock braking system in a car). The models may also serve an educational purpose of educating others on the basic principles governing physical systems. The models and results are often used as a scientific communication medium between humans. The term "model-based design" is used to refer to the use of graphical models in the development, analysis, and validation of dynamic systems.

Dynamic systems are typically modeled in model environments as sets of differential, difference, and/or algebraic equations. At any given instant of time, these equations may be viewed as relationships between the system's output response ("outputs"), the system's input stimuli ("inputs") at that time, the current state of the system, the system parameters, and time. The state of the system may be thought of as a numerical representation of the dynamically changing configuration of the system. For instance, in a physical system modeling a simple pendulum, the state may be viewed as the current position and velocity of the pendulum. Similarly, a signal-processing system that filters a signal would maintain a set of previous inputs as the state. The system parameters are the numerical representation of the static (unchanging) configuration of the system and may be viewed as constant coefficients in the system's equations. For the pendulum example, a parameter is the length of pendulum and for the filter example; a parameter is the values of the filter taps.

Generally, graphical analysis and modeling methods, such as the block diagram method, are used in modeling for design, analysis, and synthesis of engineered systems. The visual representation allows for a convenient interpretation of model components and structure and provides a quick intuitive notion of system behavior.

During the course of modeling and simulation, it is often desirable to be able to observe particular data values at certain locations of the model, or to observe how data is transformed through the model. Examples of such data values include signal values, states, work areas, and parameters. Signal displays used in conjunction with a system-level design environment, such as Simulink®, often require multiple display mechanisms to be associated simultaneously with multiple signals to monitor the progress of a model at various points of interest. Currently, block diagram environments offer "scope" blocks to be used in such situations, with each scope connected to a signal of interest in the model. Alternatively, environments such as Real-Time Workshop® (manufactured by The MathWorks, Inc. of Natick Mass.) offer interfaces to various data values of the model, such that an individual can non-intrusively observe the data values.

In many systems, the dynamic range of values appearing within the system is of interest when verifying operation of the system. For example, some system components which take as input numeric values that change over time may operate properly only if the inputs fall within a prescribed numerical range; system performance may be negatively impacted if the values fall outside the range. In this example, knowledge of the dynamic range of input values under situations of interest is an important characterization of the system.

Dynamic range is a ratio of the maximum data value to the minimum data value. Typically, mechanisms used to retain values within a dynamic system have associated with them limits on their maximum dynamic range. The dynamic range limit can arise from several sources: constraints imposed on system components such that they operate within a prescribed specification, for interoperability, safety, or performance reasons; a physical limitation on the operation of an analog system component, such as saturation limits on an analog amplifier; or storage considerations of digital system components, whereby values can be accurately retained only if they fall within prescribed range limits. These examples are representative and by no means exhaustive. Failure to adhere to such dynamic range limits can lead to poor system performance, incorrect system operation, or overall system failure. Assessment of the dynamic range of values occurring within the system is thus of great importance.

However, conventional non-intrusive approaches to observing the various data elements, such as dynamic range, do not allow users to observe the data synchronously with the various execution events in the block-diagram or other operating model. Such synchrony is necessary in many scenarios because data values may be not be in a deterministic observable state at all times during model execution. An example of such a scenario is when a signal memory location is reused by multiple blocks for efficiency reasons. Furthermore, allowing synchronous observation of the data also ensures that observers of the data are operating optimally, for example when the data values are refreshed.

SUMMARY OF THE INVENTION

There is a need in the art for a design tool that interacts with an executing model in a manner that is non-intrusive, but that is also synchronized with the model as the model executes. The interaction can be decoupled from the model as a remote monitoring tool, which can observe data from or for the model as it executes and perform dynamic range assessment using the observed data. The present invention is directed toward further solutions that address this need.

In accordance with various aspects of the present invention, a remote monitoring tool is provided. The monitoring tool can non-intrusively collect data of interest of a model. Data of interest can be dynamically selected for monitoring. The monitoring tool can initiate an action upon occurrence of a predetermined execution event of the model. Data of interest may also be dynamically selected upon occurrence of a condition. The monitoring tool can access at least one of data and an event of the model using one of block diagram primitives and textual language primitives.

In accordance with one embodiment of the present invention, in a graphical modeling environment operating on an electronic device, a method of using a remote monitoring tool includes connecting it to the graphical modeling environment prior to execution, during execution, or after execution of a model. The method continues with operating the at least one remote monitoring tool to perform dynamic range assessment. The remote monitoring tool is detachable from the model during execution of the model in the graphical modeling environment.

In accordance with one embodiment of the present invention, a medium is provided for use in a graphical modeling environment on an electronic device. The medium holds instructions executable using the electronic device for performing a method of using a remote monitoring tool. The method includes connecting at least one remote monitoring tool to the graphical modeling environment prior to execution, during execution, or after execution of a model. The method continues with operating the at least one remote monitoring tool to perform dynamic range assessment. The remote monitoring tool is detachable from the model during execution of the model in the graphical modeling environment.

In accordance with one example embodiment of the present invention, the at least one remote monitoring tool can be implemented using block diagram primitives. These primitives are aggregated into the block-diagram automatically prior to execution by the modeling environment.

In accordance with one example embodiment of the present invention, the at least one remote monitoring tool can be implemented as an event-listener application programming interface (API). This API can provide a non-intrusive and synchronized interface. The listener may be implemented using one of block diagram primitives and textual language primitives.

In accordance with one example embodiment of the present invention, the at least one remote monitoring tool can be implemented as a set of callbacks. These callbacks are invoked synchronously with block-diagram execution events. The callbacks may be implemented using one of block diagram primitives and textual language primitives.

In accordance with another aspect, in an electronic device supporting a graphical modeling environment, a method of debugging a model using a remote monitoring tool is provided. The method comprises connecting at least one monitoring tool to the graphical modeling environment prior to execution, during execution, or after execution of the model. The method continues with operating the at least one monitoring tool to perform dynamic range assessment on data of interest of the model. Based on the results of the dynamic range assessment, the model may then be modified. Further monitoring can then be performed.

In accordance with another aspect, a system for generating and displaying a graphical modeling application is provided. The system comprises a distribution server and a client device in communication with the distribution server. The distribution server provides to the client device, a remote monitoring tool for performing dynamic range assessment.

In accordance with another aspect, in a network having a server, executing a graphical modeling environment, and a client device in communication with the server, a method is provided. The method comprises selecting, at the server from the client device, data of interest of a model in the graphical modeling environment; invoking the remote monitoring tool synchronously with model execution in the graphical modeling environment; performing dynamic range assessment on the data of interest using the remote monitoring tool; and outputting, from the server to the client device, the result of the dynamic range assessment.

BRIEF DESCRIPTION OF THE DRAWINGS

The present invention will become better understood with reference to the following description and accompanying drawings, wherein.

DETAILED DESCRIPTION

Figure 1:
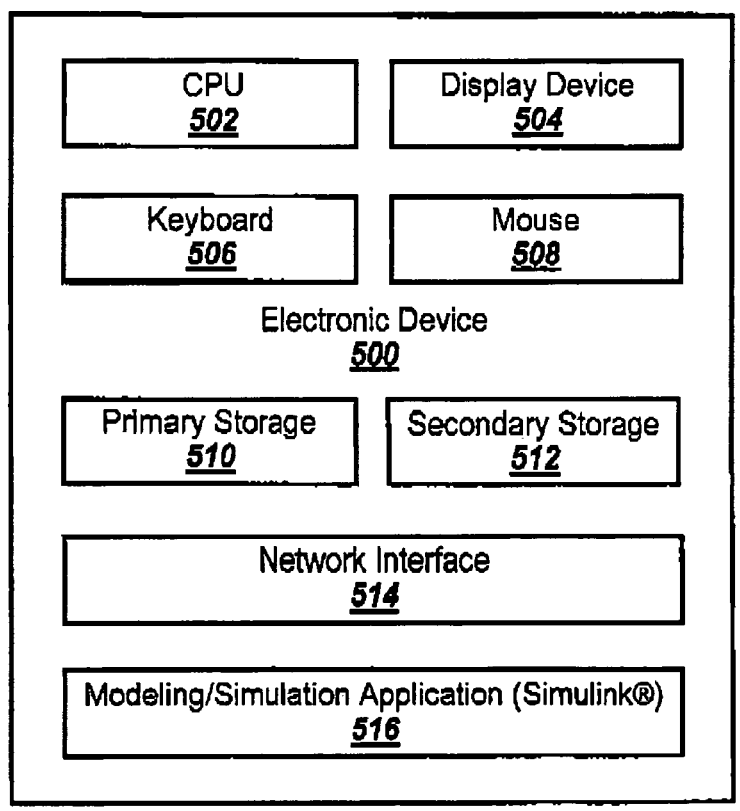
FIG. 1 is a is a diagrammatic illustration of an electronic device that can be utilized to execute a method performed in an embodiment of the present invention.

An illustrative embodiment of the present invention relates to a remote monitoring tool and corresponding method of use. The remote monitoring tool is configured to perform dynamic range assessment. The remote monitoring tool is non-intrusively and synchronously connected to a graphical modeling environment prior to execution, during execution, or after execution of a model. The remote monitoring tool is detachable from the model during execution of the model in the graphical modeling environment.

The remote monitoring tool is non-intrusive to the graphical model, such that the remote monitoring tool is not embedded in the model in the same way that other elements of the model are interconnected and embedded. In the case of a graphical model using blocks and signals, the user does not add blocks or signals to the model diagram when attaching a remote monitoring tool in accordance with the present invention to the model. Rather, data of interest is selected for monitoring, and during execution the model informs the remote monitoring tool of events of which the tool has requested to receive notification. The process of sending an event can be achieved through, but not limited to, an event-listener application programming interface (API), a callback based interface, and/or model and remote monitoring tool aggregation for execution. The remote monitoring tool can work with execution modes that include but are not limited to interpretive, accelerated, or generated code model execution modes.

FIGS. 1 through 9, wherein like parts are designated by like reference numerals throughout, illustrate example embodiments of a remote monitoring tool capable of performing dynamic range assessment, and corresponding method of use, according to the present invention. Although the present invention will be described with reference to the example embodiments illustrated in the figures, it should be understood that many alternative forms can embody the present invention. One of ordinary skill in the art will additionally appreciate different ways to alter the parameters of the embodiments disclosed in a manner still in keeping with the spirit and scope of the present invention.

FIG. 1 illustrates one example embodiment of an electronic device 500 suitable for practicing the illustrative embodiments of the present invention. The electronic device 500 is representative of a number of different technologies, such as personal computers (PCs), laptop computers, workstations, personal digital assistants (PDAs), Internet appliances, cellular telephones, and the like. In the illustrated embodiment, the electronic device 500 includes a central processing unit (CPU) 502 and a display device 504. The display device 504 enables the electronic device 500 to communicate directly with a user through a visual display. The electronic device 500 further includes a keyboard 506 and a mouse 508. Other potential input devices not depicted include a stylus, trackball, joystick, touch pad, touch screen, and the like. The electronic device 500 includes primary storage 510 and secondary storage 512 for storing data and instructions. The storage devices 510 and 512 can include such technologies as a floppy drive, hard drive, tape drive, optical drive, read only memory (ROM), random access memory (RAM), and the like. Applications such as browsers, JAVA virtual machines, and other utilities and applications can be resident on one or both of the storage devices 510 and 512. The electronic device 500 can also include a network interface 514 for communicating with one or more electronic devices external to the electronic device 500 depicted. A modem is one form of network interface 514 for establishing a connection with an external electronic device or network. The CPU 502 has either internally, or externally, attached thereto one or more of the aforementioned components. In addition to applications previously mentioned, modeling applications, such as Simulink® 516, can be installed and operated on the electronic device 500.

It should be noted that the electronic device 500 is merely representative of a structure for implementing the present invention. However, one of ordinary skill in the art will appreciate that the present invention is not limited to implementation on only the device 500 as described herein. Other implementations can be utilized, including an implementation based partially or entirely in embedded code, where no user inputs or display devices are necessary. Rather, a processor can communicate directly with another processor or other device.

Turning now to example embodiments of the present invention, the method and system of the present invention operate in a block diagram modeling environment, such as that of Simulink®. The block diagram modeling environment is otherwise referred to herein as the graphical model. One of ordinary skill in the art will appreciate that there are a number of different graphical modeling and simulation applications that make general use of blocks or other graphical representations to model or simulate conditions, events, designs, operations, and the like, or to model and control events implemented on hardware devices, and the like. Accordingly, the present invention is intended for use on all such modeling applications.

The present invention is generally directed to a system and method for interacting non-intrusively, yet synchronously, with a graphical model. FIG. 2 is a screen depiction of a graphical model 10 simulating a dynamic process. FIG. 2 shows a version of a time-based or event-based block diagram graphical model 10. As referred to herein, graphical model 10 is intended to encompass multiple variations of graphical model. Graphical model 10 is formed generally of a plurality of blocks 11 that pass signals 13 to represent a dynamic system. The particular use or purpose of the graphical model 10 can vary to include anything that can be modeled using a graphical modeling environment. Thus, the present invention is not limited to the specific example embodiments discussed herein, as understood by one of ordinary skill in the art.

In the example embodiment, time-based graphical models 10 have blocks 11 connected by signals 13. Blocks 11 are responsible for computing the values of signals 13 as time progresses. The arrows denote the computational direction of the signal. Input ports read signals and output ports write signals. The user of the present invention may wish to obtain a reading of a value of one of the signals 13 in the graphical model 10, or of one of the processes in one of the blocks 11. However, in the graphical model 10 illustrated, there is no instance of a scope shown with the model. Accordingly, if the graphical model 10 is running a model execution at the time illustrated in the figure, conventional modeling applications in the situation illustrated have no mechanism for a user to be able to take readings of signal or internal block/model states synchronously.

However, with the remote monitoring tool of the present invention in accordance with one embodiment, an event-listener API or equivalent tool is provided to associate the tool with the graphical model 10 without being embedded in the graphical model 10. For example, if the user wishes to know the value of the signal at point A in the graphical model 10 for the purpose of performing dynamic range assessment, the user implements the remote monitoring tool of the present invention to initiate an observation event. The user registers with the model, using the event-listener API, a request to invoke the monitoring tool when point A in the graphical model 10 is computed by the source block of the signal of point A. As the model is executing, when the signal at point A is re-computed by the source block of the signal, an event is sent to the listener. The listener in this illustrative example reads the value of the signal at point A which can then be used in assessing dynamic range at that point in the model. It should be noted that throughout this description the example embodiments make use of an API form of tool to connect the remote monitoring tool to the model. However, one of ordinary skill in the art will appreciate that the remote monitoring tool does not need to be implemented in the form of an API, but rather, can be implemented using a number of different tools, including library based modules, and other tools. As such, references to an API in the present description are intended to include APIs as well as such other equivalent tools noted above. In addition, an alternative example embodiment of the present invention makes use of an aggregation programming paradigm to achieve the non-intrusive and synchronized behavior of the remote monitoring tool.

Figure 2A:
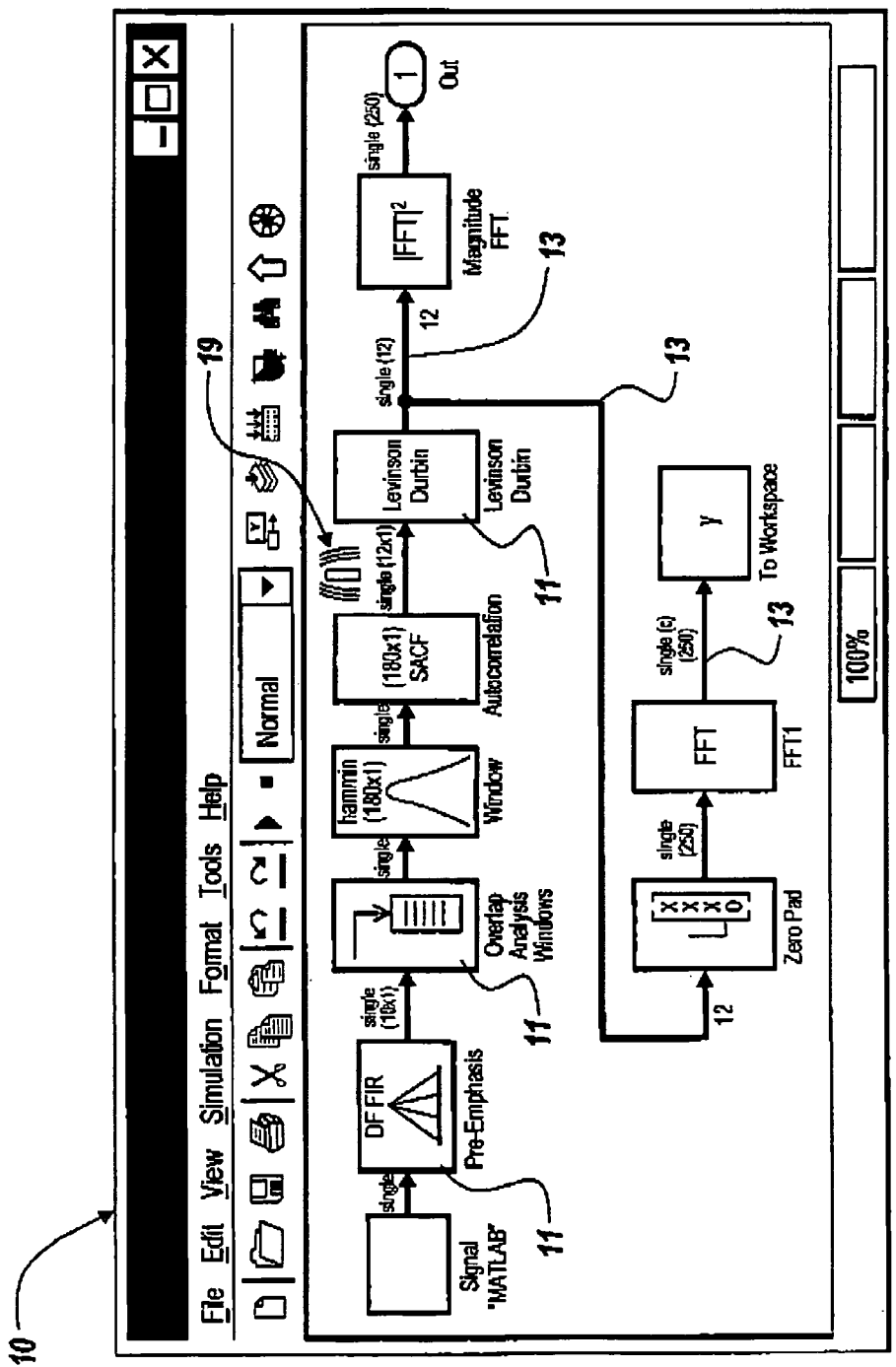
FIG. 2A is a screen depiction of an example model that can make use of the tool and method according to one aspect of the present invention.
Figure 2B:
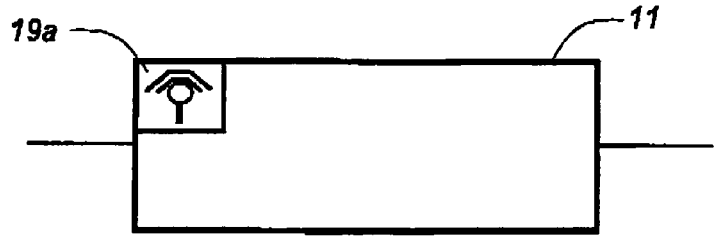
FIG. 2B is another embodiment of model block having a symbol indicating a connected remote monitoring tool.

The remote monitoring tool does not need to be represented graphically in the graphical model 10. However, because the remote monitoring tool registers listeners with the model, the model can insert a graphical symbol or text, such as symbol 19 in FIG. 2A, or other representation in the graphical model 10 showing the existence of the listener for the remote monitoring tool. Such graphical representation can be, for example, shown in the block 11, indicating the remote monitoring tool is connected to the internal state of the block 11 and not the signal 13. More specifically, in the illustrative example showing the symbol 19, connections made by the remote monitoring tool can be described by selection of one or more signals 13 from a list of all available signals 13 in the graphical model 10. The remote monitoring tool can also be described by the direct entry of an identification of one or more signals 13 in the graphical model 10. The connections can be highlighted at some point in time, to associate a symbol 19 with one or more selected signals 13. For example, this can be accomplished by pressing a button in the display interface, with the corresponding signal 13 in the model highlighted by color, blinking, or other temporary or persistent graphical indication, in addition to textual or other representations. The connection can also be highlighted by a graphical affordance in the graphical model 10, such as a "test point" symbol (small 'lollipop' icon) connected to a signal line for as long as the virtual connection remains. For connections to internal block state as in the illustrative block 11, the connections can be created in similar fashion to signal selection, except that a block 11 is selected. Likewise the connection of a remote monitoring tool to a block 11 may be represented by "test point" symbol 19a, an example of which can be as seen in FIG. 2B.

The remote monitoring tool can be connected to the model 10 using an event-listener API. More specifically and in accordance with an example embodiment of the present invention, the API that enables the practice of the remote monitoring tool in accordance with the present invention, includes the presence of user-definable pre-execution and/or post-execution callbacks or events associated with any of the methods of the computational blocks in the graphical model 10, such that the callback or event enforces proper synchronization for data transfer to and from the tool. Such an API can likewise be provided where the definitions refer to data nodes in a physical hardware device, such as memory locations in a processor, a physical I/O protocol for a processor or an FPGA or ASIC, or some other defined method for data delivery, as understood by one of ordinary skill in the art. A unique identifier can be provided for each signal in the graphical model 10 or hardware, such that the tool can be associated with any signal or group of signals. Methods to read signal data via the unique identifier, which can be synchronized by the pre-execution and/or post-execution callback or event, can be provided. Furthermore, textual, graphical, audio, visual, tactile, or other data rendering techniques and capabilities supported by, or interfaced to, the modeling environment can be provided, such that the signal data is presented to user in a discernable manner.

The remote monitoring tool can include different types of tools, such as display scopes, strip chart recorder, an oscilloscope, a spectrum analyzer, a 2-port network analyzer, a logic signal display, a waterfall plot, a communications constellation plot, an audio output device, and a video display device. The monitoring tool can also be a non-graphical tool, such as a tool that reads the model data (such as the signal at point A of the illustrative model 10) and sends the data to another system for processing. One of ordinary skill in the art will appreciate that the present invention is not limited to using the event-listener API to non-intrusively and synchronously connect the remote monitoring tool(s) to the model.

Ideally, the monitoring tool is used in performing dynamic range assessment on the monitored system. Dynamic range assessment may take place during the design and simulation phase of building a system, when the model of the system is being created. It may take place during the test of subsystems of the simulation system, or as a test on the completed simulation system. It may also take place on the actual system produced, such as a DSP implementation of a signal processing system. This latter case may be accomplished by communication with the final hardware system, such as in hardware-in-the-loop (HIL) test systems.

The number of nodes within a block diagram that are tracked within a system as part of a dynamic range assessment can vary widely, depending on the particular assessment being conducted. The assessment can be a partial characterization of just a single component or just a single computation of interest within a single component; it might be across a subsystem of components for a specific operation; it might be characterization of a class of components having certain system characteristics (such as all components of a particular type); or across all values produced within an entire system as a whole.

The digital implementation of a system is of particular interest. The dynamic range constraint often arises from a pre-selected number of bits used to represent values within a digital system, the storage location being an address in a computer memory or a register of certain size within a processor (GPP, DSP, etc), a predetermined number of storage locations allocated for this purpose within an ASIC or FPGA, or other temporary or permanent storage mechanism exhibiting a constraint on the number of bits used to represent a numeric value. Dynamic range characterization of constant values (that is, values that are certain to remain fixed throughout the course of simulation) may be of interest for characterization. Of even greater interest is the characterization of dynamic values, that is, values that are subject to change during the course of simulation.

In another embodiment, it may be desirable to change the implementation of a system, in which the mechanisms used to retain values within the system (such as a set of pre-defined data types) impose limits on the representation of dynamic range. An example of this is the change from floating-point to fixed-point numeric representation of digital values.

Typically the types of measurements made for dynamic range assessment include minimum and maximum values observed at the node(s) monitored by the remote monitoring tool as well as histograms of the data being monitored. In some embodiments mean values may be determined. In certain embodiments, the remote monitoring tool may also be configured to monitor the number of times a specific set of threshold values has been crossed. Other possible configurations and measurements will apparent to one skilled in the art given the benefit of this disclosure.

In addition, the displays of the remote monitoring tool, if required, are provided separate from the graphical model 10, thus keeping with the non-intrusive feature of this invention. Likewise, a GUI can be provided with a multiple-document interface type of layout in which a master GUI contains one or more visual display device windows with additional interfaces for managing the connections to the model corresponding to each remote tool.

Figure 3:
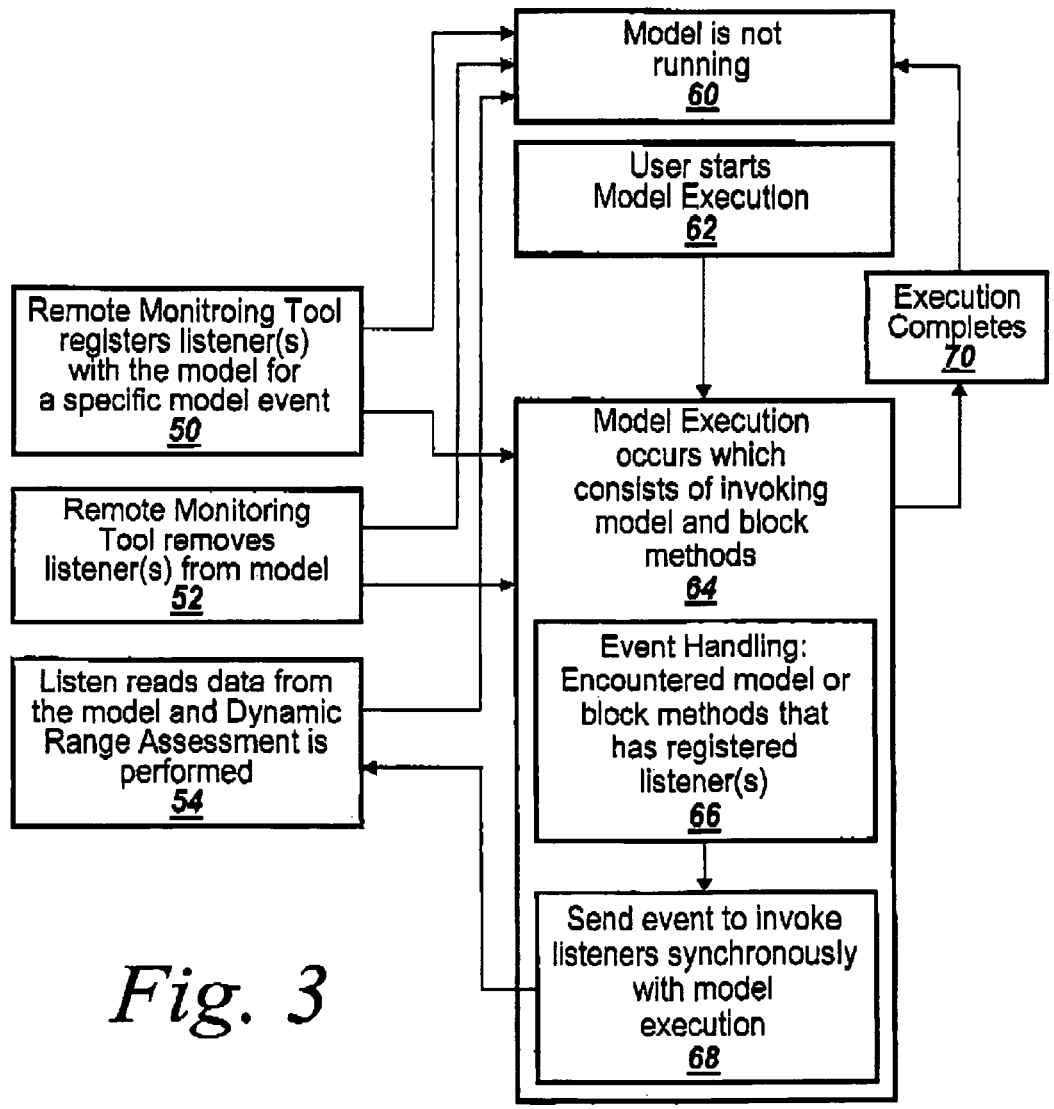
FIG. 3 is a diagrammatic illustration of a method of use of the tool, in accordance with embodiments of the present invention.

Several example embodiments of implementations of the remote monitoring tool in accordance with the present invention are described herein. In addition, FIG. 3 is a diagrammatic illustration of a method of using the remote monitoring tool realized using the event-listener API. In accordance with one example embodiment of the present invention, a user can attach a remote monitoring tool to a model to listen to specific events before, during, or after model execution (step 50). The user can detach a remote monitoring tool before, during, or after graphical model (10) execution (step 52). Connections to the model (10) by the remote monitoring tool are maintained while the model is not running (step 60). When the model is not running (step 60), the user can edit the model and possibly change it structure. If the act of editing the model deletes an object such as a block (11) or line (13) that is connected to a remote monitoring tool, the tool becomes disconnected from the model.

The user can start the model execution (step 62). During model execution model and block methods are invoked. Within Simulink® this consists of a simulation loop. Each computational block in Simulink® may contain multiple runtime methods that are executed within the simulation loop. Simulink® decomposes block methods by type and executes them in a predefined manner from model models that are invoked by the simulation loop. During execution of a model or block method (step 64), if a block with registered listeners is encountered (step 66), the model sends an event (step 68) causing the remote monitoring tool to execute. Dynamic Range assessment can then be performed. When execution completes (step 70), the model returns to the not running state (step 60).

Figure 4A:
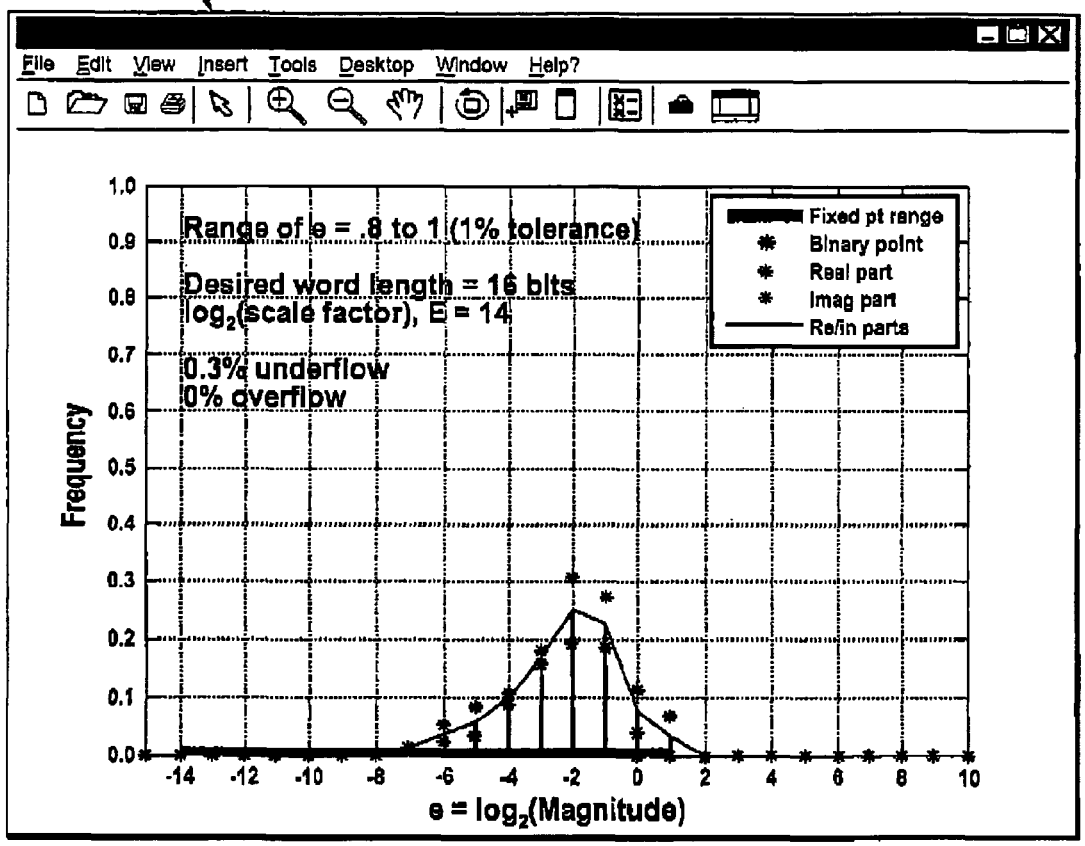
FIG. 4A is a screen depiction of an example tool, according to one aspect of the present invention.
Figure 4B:
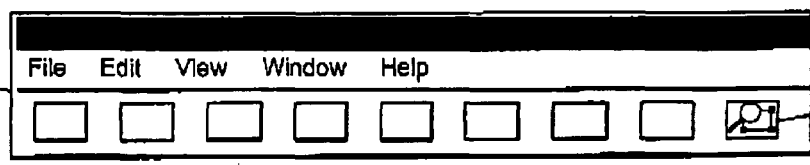
FIG. 4B is a screen depiction of the toolbar of the example tool of FIG. 4A.

One example implementation of the remote monitoring tool of the present invention is shown in FIGS. 4A-4D. FIG. 4A is a screen depiction of a tool resulting from the user implementing the remote monitoring tool. The remote monitoring tool presents a histogram plot 12 showing dynamic range. The histogram plot is a visual display of the dynamic range for the graphical model at point A. The remote monitoring tool can include a number of different interfacing options, some of which can be implemented in a toolbar configuration. For example, FIG. 4B shows a toolbar 14 having a number of standard buttons. One of ordinary skill in the art will recognize there can be several button configurations. One example button that can be utilized in conjunction with the present invention is a highlight button 16 which when clicked on will highlight the signal in the graphical model 10 being displayed by the remote monitoring tool.

Figure 4C:
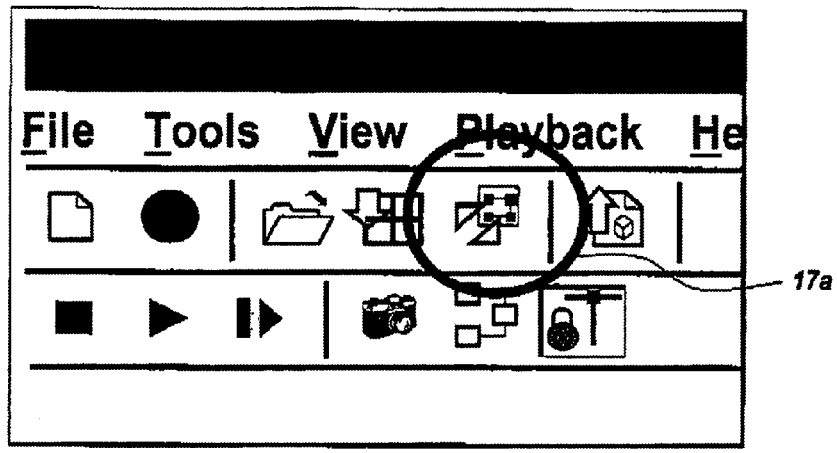
FIG. 4C is a screen depiction of another toolbar embodiment of the example tool of FIG. 4A depicting one state of a remote monitoring tool.
Figure 4D:
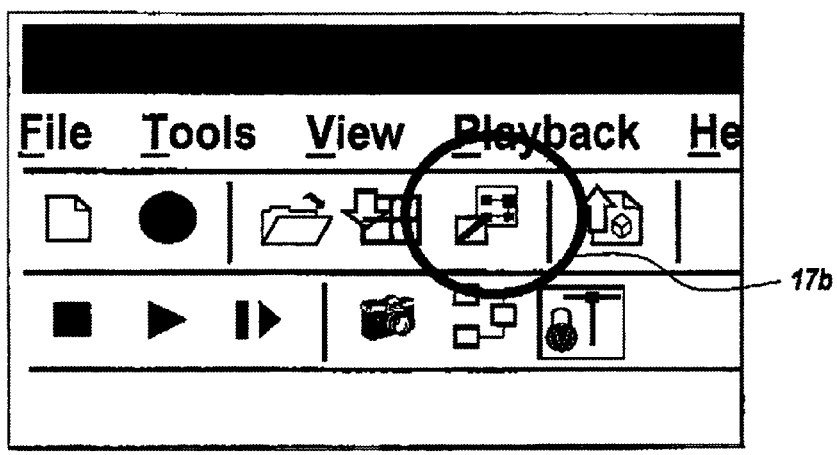
FIG. 4D is a screen depiction of toolbar embodiment of FIG. 4C depicting another state of a remote monitoring tool.

Another example toolbar 15 can be seen in FIGS. 4C and 4D. In this implementation the toolbar 15 has a button for connecting and disconnecting a remote monitoring tool. They button may also indicate the current state of connectivity for the remote monitoring tool. In FIG. 4C the button 17a indicated that the remote monitoring tool is currently disconnected and the user may click the button 17a to connect the remote monitoring tool. In FIG. 4D the button 17b indicates the remote monitoring tool has been connected and the user may click the button 17b to disconnect the remote monitoring tool.

In addition, the remote monitoring tool interface in a particular embodiment can vary. For example, in FIG. 5, the remote monitoring tool is implemented as a multiple document interface (MDI) style GUI design, incorporating multiple display devices in a single master window 18. In this example, there are connections established for each display corresponding to signals originating from multiple graphical models 10. A first display 20 reports data from a first graphical model. A second display 22 reports data from a second graphical model. A third display 24 and a fourth display 26, report data from a third and fourth graphical model. The remote monitoring tool is formed of the collection of the displays 20, 22, 24, and 26. Each of the displays operates independently and pulls data from different model locations. The displays can pull data from the same model location if desired. Furthermore, as mentioned previously, each of the collection of the displays 20, 22, 24, and 26 forming the remote monitoring tool can be individually or collectively attached or detached from the graphical models before, during, or after the graphical models are implemented.

Figure 5:
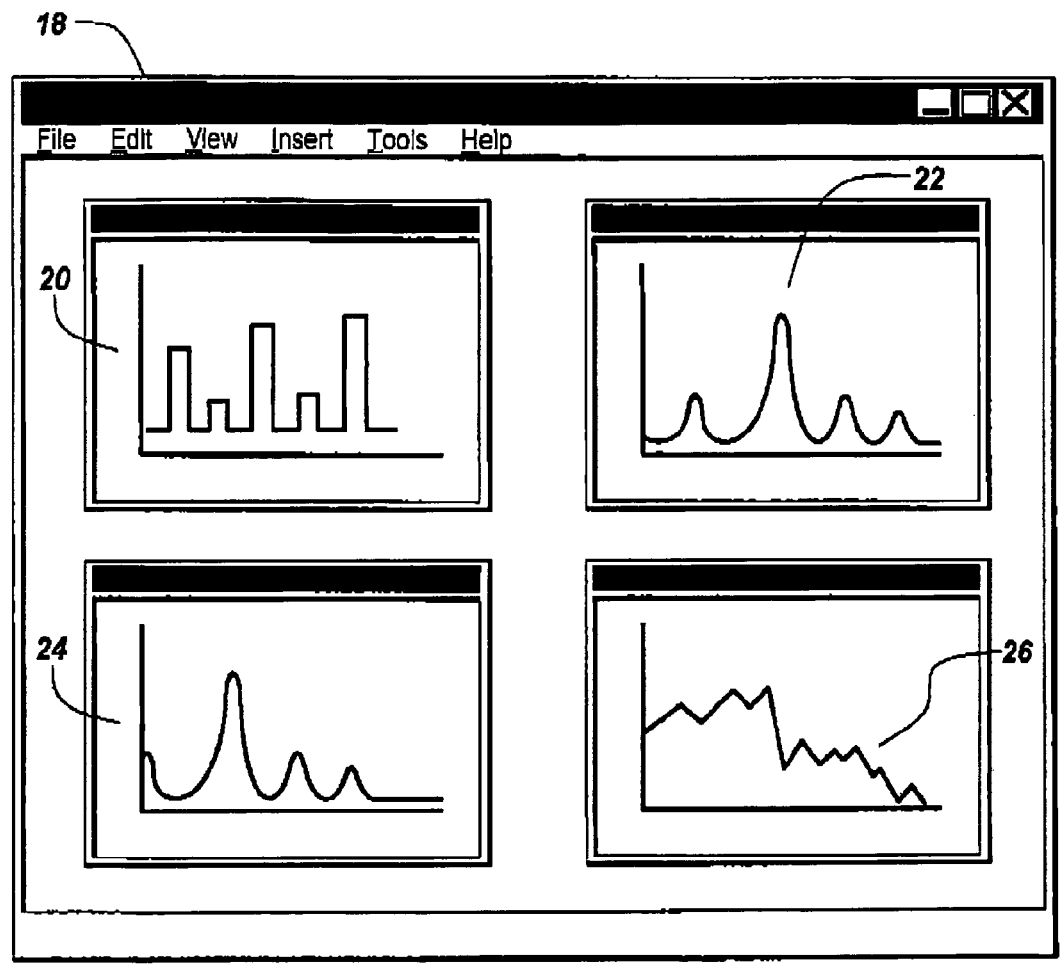
FIG. 5 is a screen depiction of multiple displays for a tool, according to one aspect of the present invention.
Figure 6:
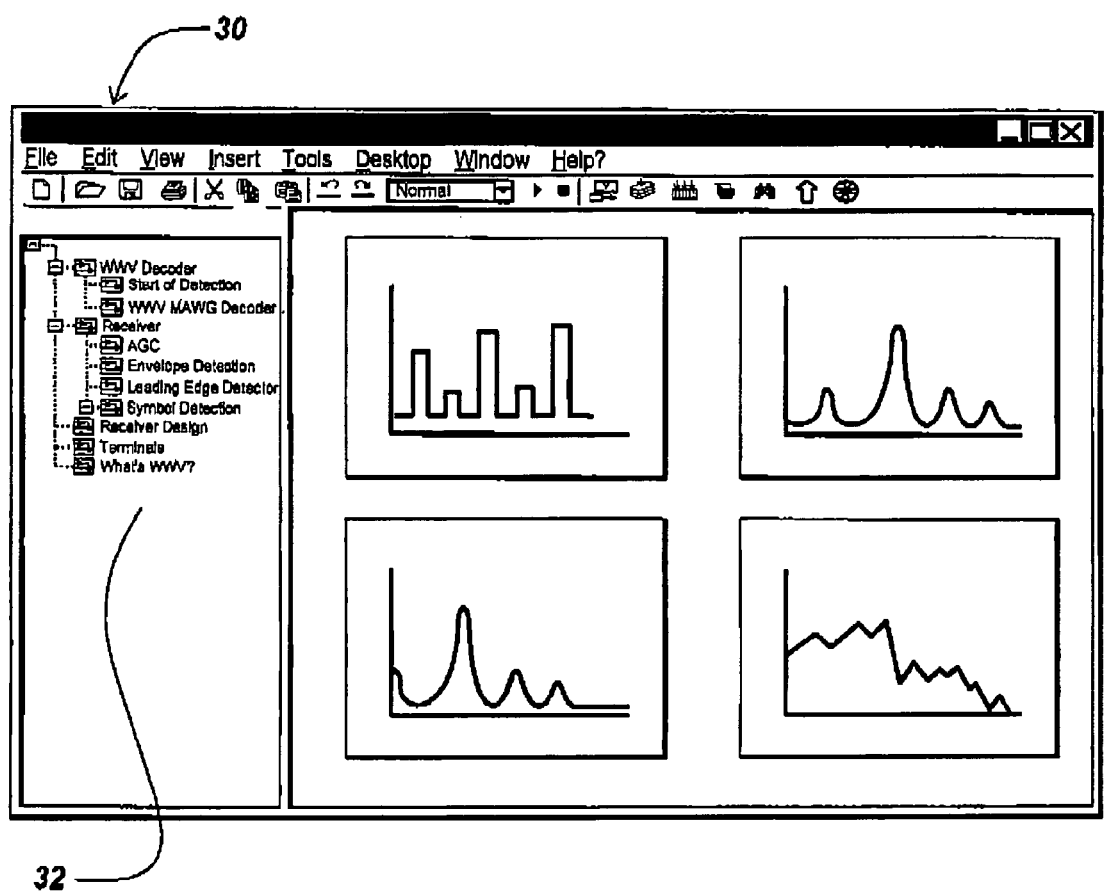
FIG. 6 is a screen depiction of multiple displays, according to one aspect of the present invention.

FIG. 6 is another screen depiction of an MDI GUI 30 with a pre-loaded collection of displays forming the remote monitoring tool, such as those illustrated in FIG. 5. In addition, the remote monitoring tool in this example embodiment includes a remote connection manager 32. The remote connection manager 32 provides an organized GUI that enables a user to track and select different elements making up the remote monitoring tool. One of ordinary skill in the art will appreciate that the example remote connection manager 32 is shown as a tree structure. However, any number of file organization techniques and configurations can be utilized to generate the remote connection manager 32, such that the manager 32 is not limited to the specific embodiment illustrated.

As described, the remote monitoring tool includes at least one tool. The remote monitoring tool is attached to the model in the graphical modeling environment prior to execution, during execution, and/or after execution of a model. The remote monitoring tool is detachable from the model during execution of the model in the graphical modeling environment.

The monitoring tool non-invasively collects data after data of interest has been selected 10. The selection of the data of interest can be displayed in accordance with the examples illustrated herein. In addition, the remote monitoring tool can initiate an action upon selection of a predetermined characteristic of the data or event observed. For example, if a predetermined data point, such as a maximum or a minimum, is achieved in a graphical model as it is running, the remote monitoring tool can register the occurrence and forward instructions or implement other actions to address the occurrence. Such actions may include pausing the model execution, forwarding data relating to other points in the model at the time of the occurrence, sending a message to the user, implementing a change in the operation of a separate model and/or hardware device, and the like.

The remote monitoring tool configurations can be saved in the graphical model, or can be saved separate from the graphical model. In addition, one of ordinary skill in the art will appreciate that a reference or other identifier to a specific remote monitoring tool can likewise be stored within the graphical model or separate from the graphical model being viewed or manipulated by the remote monitoring tool. Furthermore, the selection of blocks, signals, or ports to be interfaced with the remote monitoring tool can be performed using any available interface mechanism, including graphically, textually, data, and can be implemented through in-direct or direct connection to other software or hardware, and the like, in addition to user interface.

In the embodiments presented herein, the remote monitoring tool configurations consist of the various attributes of the tool the user has created. The tool can be connected to the model using an object selector. The object selector is one component of the remote monitoring tool that associates each tool the user has created with objects (e.g. blocks, signals, or ports) in the model. For example, the selection of model objects (blocks, signals, or ports) to be connected to a remote monitoring tool can be done using a signal selector that displays the model hierarchy in a textual fashion. The user navigates to the desired object in the textual hierarchy and connects the tool to the object. Alternatively, the user can select an object in the model and then click a button in the signal selector to attach the remote monitoring tool to the selected object.

Figure 7:
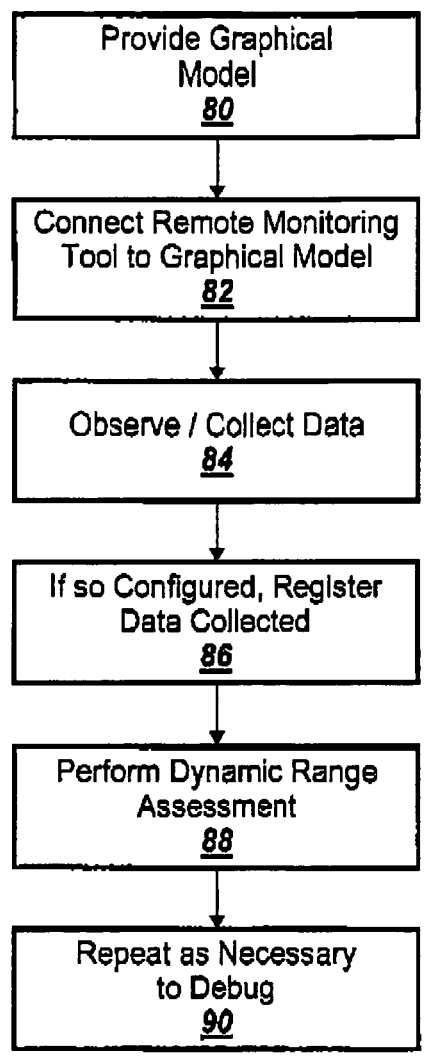
FIG. 7 is a flowchart illustrating an example method of use of the tool, in accordance with embodiments of the present invention.
Figure 8:
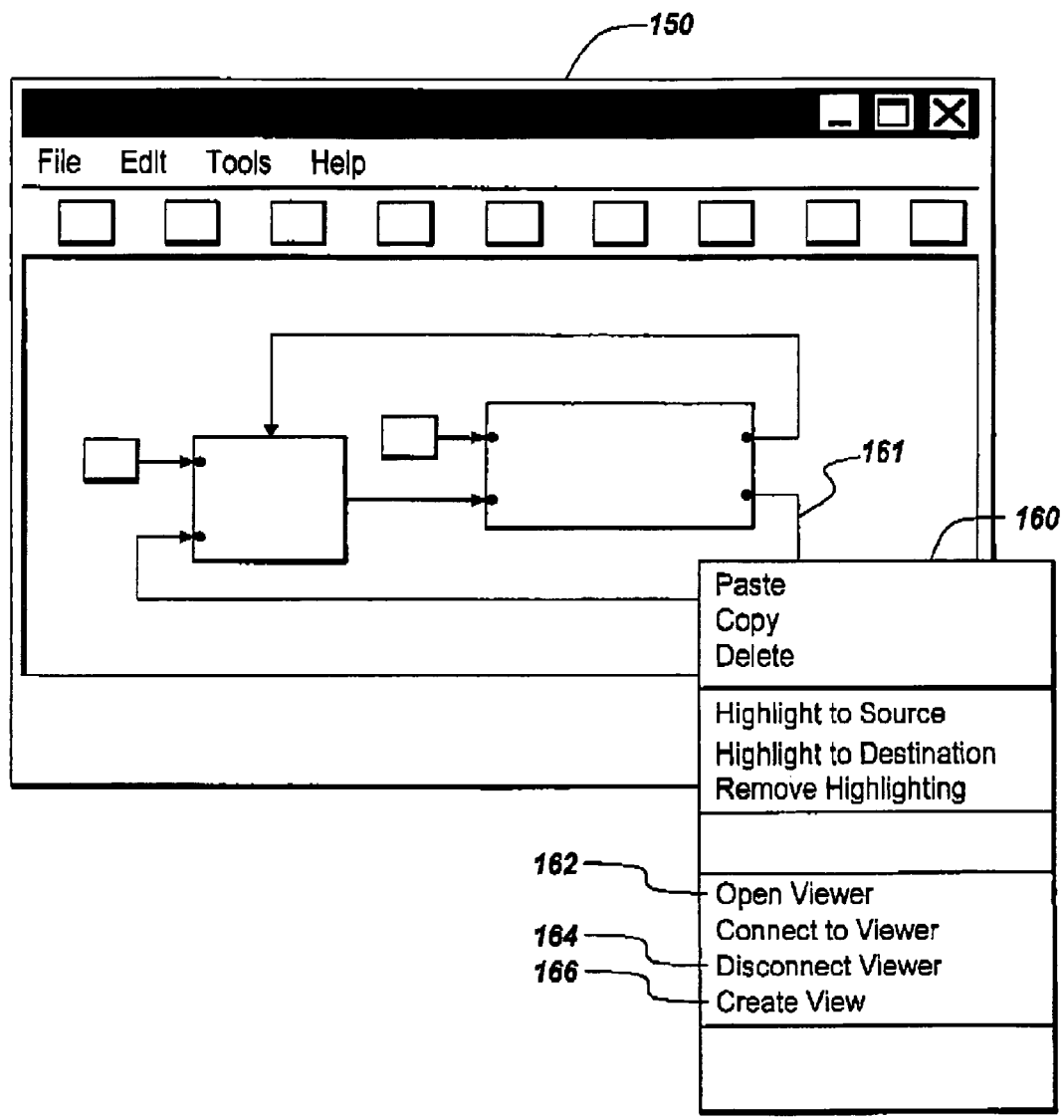
FIG. 8 is a screen depiction of context sensitive menus used to connect the tool to a model.

It should be noted that one useful implementation of the remote monitoring tool of the present invention is in the performance of debugging of a system being modeled using the graphical model 10, as shown in FIG. 7. To debug an operating model, the model is first provided (step 80). The user implements an instance of the remote monitoring tool (step 82). At this point, the remote monitoring tool can influence the next steps. The user may attach the remote monitoring tool at a point in the model at which access to data is desired or collect data (step 84). If desired, the data collected can be registered (step 86). The remote monitoring tool can then perform dynamic range assessment (DRA) (step 88), while still maintaining its non-invasive characteristics in the graphical model. The steps can be repeated as necessary to debug the model (step 90).

One skilled in the art will recognize that there are several ways to attach monitoring tools to a model. In one example shown in FIG. 8 as model 150, an alternative embodiment of the present invention can be used to connect or disconnect remote monitoring tools from the model 150. One can bring up the context sensitive menu for a signal 160 by right-clicking on a signal, such as signal 161. Within the context sensitive menu one can open a viewer that is connected to the signal using an open viewer selection 162 (note multiple viewers can be connected to one signal), disconnect one or all of the viewers connected to the signal using a disconnect selection 164, or create and connect a new viewer using a create view selection 166.

When executing the model using an interpretive engine, the event-listener paradigm provides a straight forward means by which to support the remote monitoring tool. However, one skilled in the art recognizes that a model can be translated to generated code, where the generated code can be a high-level programming language such as C, Java, or C++ or assembly code. To support the adding and removing of remote monitoring tools during execution, the generated code can be instrumented before and after each block method. Alternatively, a run-time engine can be created which, using the executable created after compiling and linking the code, can instrument the executable with entry points before and after the code for each model and block method, thus enabling one to implement the event-listener architecture enabling the removal and addition of remote monitoring tools during model execution.

An alternative to the event-listener paradigm for synchronously connecting the remote monitoring tool to the model is to aggregate the model objects and the remote monitoring tool(s) into one execution engine. This can be done when the connections to the model are made prior to model execution and are not altered during execution. The remote monitoring tool is not added to the graphical definition of the model; rather, an internal aggregated representation of the model is formed consisting of both the model objects plus the remote monitoring tools. After this is done, an internal execution structure can be created by translating the model into executable operations or generated code. If the connections are altered during execution, it is necessary to know a priori the full range of alterations that may be performed. Otherwise, dynamic alteration of the execution structure needs to occur and dynamic alteration of the execution structure is very similar to the event-listener paradigm.

Figure 9:
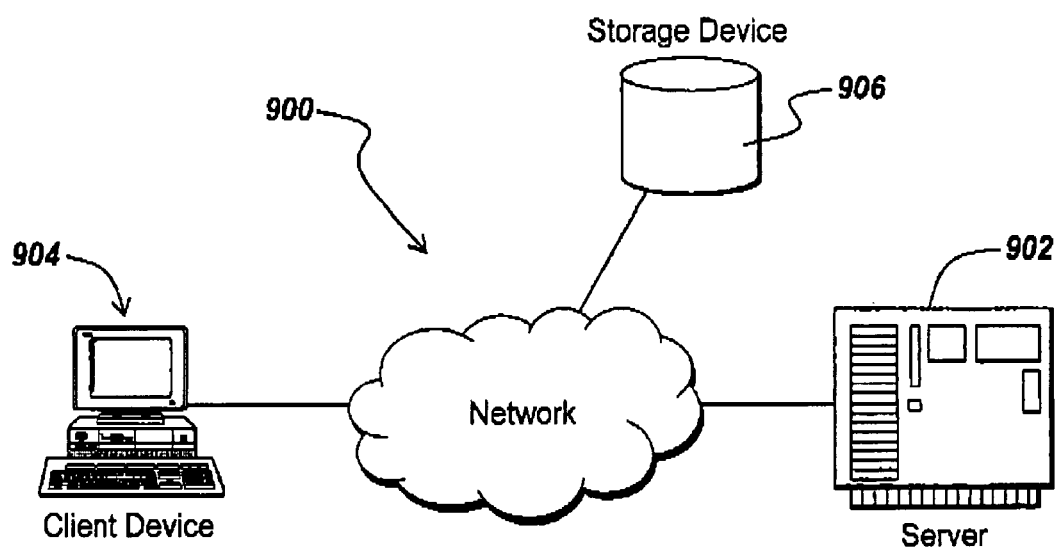
FIG. 9 illustrates a client-server environment suitable for practicing an illustrative embodiment of the present invention

The examples to this point have focused primarily on the system where the graphical modeling environment was on a local electronic device. The graphical modeling environment may of course also be implemented on a network 900, as illustrated in FIG. 9, having a server 902 and a client device 904. Other devices, such as a storage device 906, may also be connected to the network.

In one such embodiment a system for generating and displaying a graphical modeling application, comprises a distribution server for providing to a client device, a remote monitoring tool for performing dynamic range assessment. Here the distribution server provides a client device, with a remote monitoring tool for performing dynamic range assessment. This remote monitoring tool may be part of a tool set available to the client on the server. The client may then use the remote monitoring tool for performing dynamic range assessment, on a block diagram for a dynamic system.

In another embodiment, the server may execute the graphical modeling environment. A user may then interact with the graphical modeling interface on the server through the client device. In one example of such a system a server and client device are provided. The server is capable of executing a graphical modeling environment. The client device is in communication with the server over a network. On the server from the client, data of interest to be monitored may be selected. The remote monitoring tool may then be invoked synchronously with model execution in the graphical modeling environment. Dynamic range assessment may then be performed and the results outputted from the server to the client device.

The remote monitoring tool provides freedom to tap into an existing and executing model at any time to collect data. Accordingly, a user attempting to diagnose or debug a model of a dynamic system can use the remote monitoring tool of the present invention to both take contemporaneous or real time readings of signal values within the graphical model and/or communicatively associated devices. One of ordinary skill in the art will appreciate that debugging is an iterative process that can be implemented in a number of different ways, such that the present invention is not limited to the specific example of debugging described herein. Rather, the present invention and corresponding method of use can vary in accordance with preferred debugging processes.

Accordingly, the present invention is generally directed to a remote monitoring tool and corresponding method of use. The tool is non-intrusive, meaning there are no explicit modeling primitives (e.g. blocks or lines) added to the graphical model. Thus, there is no requirement that the tool be programmed into the model when the model is being created. The remote monitoring tool is furthermore remote and monitoring in nature, meaning that it is separate from the graphical model. The remote monitoring tool can be connected to the graphical modeling environment prior to execution, during execution, or after execution of a model, and is also detachable from the model during execution of the model in the graphical modeling environment.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. It is intended that the present invention be limited only to the extent required by the appended claims and the applicable rules of law.

The invention claimed is:

1. A method comprising:
providing a user interface associated with a remote monitoring tool,
 the providing the user interface being performed by a device, and
 the user interface enabling a user to:
  track and select one or more elements associated with an operation of the remote monitoring tool, and
  input configuration information associated with the operation of the remote monitoring tool,
   the configuration information being stored in a model associated with the remote monitoring tool;
receiving, via the user interface, information indicating data of interest associated with the model,
 the model being provided via a graphical modeling environment, and
 the receiving the information indicating the data of interest being performed by the device;
invoking the remote monitoring tool synchronously with an execution of the model in the graphical modeling environment,
 the remote monitoring tool being connected to the model via an event-listener application programming interface,
  the event-listener application programming interface enforcing a synchronization of data being transferred between the model and the remote monitoring tool using one or more of:
  a pre-execution callback,
  a post-execution callback, or
  an occurrence of an event associated with the data of interest,
 the invoking the remote monitoring tool being performed by the device;
executing the remote monitoring tool during the execution of the model,
 the executing the remote monitoring tool being performed by the device;
the non-invasively monitoring, via the event-listener application programming interface, the data of interest based on the one or more of the pre-execution callback, the post-execution callback or the occurrence of the event,
 the non-invasively monitoring the data of interest being performed by the device;
performing a dynamic range assessment based on monitoring the data of interest,
 the performing the dynamic range assessment being performed by the device;
determining, based on performing the dynamic range assessment, a dynamic range associated with the data of interest,
 the dynamic range including a maximum data value and a minimum data value, and
 the determining the dynamic range being performed by the device; and
providing a result of the dynamic range assessment for display during the execution of the model,
 the providing the result for display being performed by the device.

2. The method of claim 1, where receiving the information indicating the data of interest includes:
receiving the information indicating the data of interest during the execution of the model.

3. The method of claim 1, where receiving the information indicating the data of interest includes:
receiving the information indicating the data of interest prior to the execution of the model.

4. The method of claim 1, where receiving the information indicating the data of interest includes:
receiving a selection of a portion of the model via the graphical modeling environment.

5. The method of claim 1, where the remote monitoring tool is expressed using block diagram primitives.

6. The method of claim 1, where the remote monitoring tool is expressed using textual programming primitives.

7. The method of claim 1, where the model includes a block, and
where receiving the information indicating the data of interest includes:
 receiving a selection of the block.

8. The method of claim 1, where the model includes a signal line, and
where receiving the information indicating the data of interest includes:
 receiving a selection of the signal line.

9. The method of claim 1, further comprising:
indicating, based on the information indicating the data of interest, a selection of the data of interest, via a display of the model, using an indicator.

10. The method of claim 1, further comprising:
indicating that a portion of the model is to be monitored during the execution of the model to collect the data of interest using an indicator displayed in conjunction with the portion of the model.

11. The method of claim 1, further comprising:
storing a reference associated with the remote monitoring tool in the model; and
where invoking the remote monitoring tool includes:
 invoking the remote monitoring tool based on the reference.

12. The method of claim 1, where the remote monitoring tool is included in a set of remote monitoring tools;
where non-invasively monitoring the portion of the model includes:
 monitoring, using another remote monitoring tool, included in the set of remote monitoring tools, a portion of another model.

13. The method of claim 1, where the remote monitoring tool is expressed using block diagram primitives, and where invoking the remote monitoring tool synchronously with the execution of the model includes:
aggregating the block diagram primitives and elements included in the model into an execution engine.

14. The method of claim 1, where the event-listener application programming interface enforces the synchronization of the data being transferred using the group identifiers and the occurrence of the event; and
where invoking the remote monitoring tool synchronously with the execution of the model includes:
registering, using the listener application programming event-listener application programming interface, interest in specific execution events associated with the execution of the model.

15. The method of claim 1, where invoking the remote monitoring tool synchronously with the execution of the model includes:
providing the remote monitoring tool expressed in block diagram primitives;
providing a callback system for incorporating the remote monitoring tool,
the callback system comprising:
an engine for generating callbacks,
the callbacks including at least one of the pre-execution callback or the post-execution callback;
generating, using the engine, the callbacks synchronously with block diagram execution events; and
registering, using the event-listener application programming interface, interest in specific execution events associated with the model.

16. An electronic device comprising:
a processor to:
provide a user interface associated with a remote monitoring tool,
the user interface enabling a user to:
track and select one or more elements associated with an operation of the remote monitoring tool, and
input configuration information associated with the operation of the remote monitoring tool,
the configuration information being stored in a model associated with the remote monitoring tool;
determine data of interest associated with the model,
the model being provided via a graphical modeling environment, and
the remote monitoring tool being connected to the model using an event-listener application programming interface,
the event-listener application programming interface enforcing a synchronization of data being transferred between the model and the remote monitoring tool using one or more of:
a pre-execution callback,
a post-execution callback, or
an occurrence of an event associated with the data of interest,
invoke the remote monitoring tool synchronously with an execution of the model,
execute the remote monitoring tool during the execution of the model,
non-invasively monitor the data of interest using the remote monitoring tool based on the one or more of the pre-execution callback, the post-execution callback or the occurrence of the event,
perform, based on monitoring the data of interest, a dynamic range assessment,
determine, based on the dynamic range assessment, a dynamic range associated with the data of interest,
the dynamic range including a ratio of a maximum data value to a minimum data value, and
provide, for display, a result of the dynamic range assessment during execution of the model.

17. The electronic device of claim 16, where, when determining the data of interest, the processor is to:
determine the data of interest during the execution of the model.

18. The electronic device of claim 16, where, when determining the data of interest, the processor is to:
determine the data of interest prior to the execution of the model.

19. The electronic device of claim 16, where, when determining the data of interest, the processor is to:
receive a selection of a portion of the model during the execution of the model via the graphical modeling environment, and
determine the data of interest based on the selection.

20. The electronic device of claim 16, where the remote monitoring tool is expressed using block diagram primitives.

21. The electronic device of claim 16, where the remote monitoring tool is expressed using textual programming primitives.

22. The electronic device of claim 16, where the model includes a block; and
where, when determining the data of interest, the processors is to:
receive a selection of the block, and
determine the data of interest based on the selection.

23. The electronic device of claim 16, where the model includes a signal line, and
where, when determining the data of interest, the processors is to:
receive a selection of the signal line, and
determine the data of interest based on the selection.

24. The electronic device of claim 16, where, when determining the data of interest, the processor is to:
determine the data of interest based on one or more of:
execution events, or
an occurrence of a condition.

25. The electronic device of claim 16, where the processor is further to:
store a reference associated with the remote monitoring tool in the model; and
where, when invoking the remote monitoring tool, the processor is to:
invoke the remote monitoring tool based on the reference.

26. The electronic device of claim 16, where the remote monitoring tool is included in a set of remote monitoring tools;
where, when monitoring the data of interest, the processor is to:
monitor other data of interest, associated with an execution of another model, using another remote monitoring tool included in the set of remote monitoring tools; and
where, when providing the result for display, the processor is to:
provide, for display, the other data of interest.

27. A non-transitory computer-readable storage medium storing instructions, the instructions comprising:
one or more instructions that, when executed by one or more processors, cause the one or more processors to:

determine data of interest associated with a model of a dynamic system,
    the model being provided via a graphical modeling environment;
invoke a remote monitoring tool synchronously with an execution of the model in the graphical modeling environment,
    the remote monitoring tool being connected to the model via an event-listener application interface,
        the event-listener application programming interface enforcing a synchronization of data being transferred between the model and the remote monitoring tool using one or more of:
            a pre-execution callback,
            a post-execution callback, or
            an occurrence of an event associated with the data of interest, and
    the remote monitoring tool providing a user interface that enables a user to:
        track and select one or more elements associated with an operation of the remote monitoring tool, and
        identify configuration information for configuring the operation of the remote monitoring tool,
            the configuration information being stored in a model associated with the remote monitoring tool;
execute the remote monitoring tool during the execution of the model,
non-invasively monitor the data of interest based on the one or more of the pre-execution callback, the post-execution callback or the occurrence of the event;
perform a dynamic range assessment based on monitoring the data of interest;
determine, based on the dynamic range assessment, a dynamic range associated with the data of interest,
    the dynamic range including a ratio of a maximum data value to a minimum data value; and
provide, for display, a result of the dynamic range assessment during the execution of the model.

28. The non-transitory computer-readable storage medium of claim 27, where the one or more instructions to determine the data of interest include:
one or more instructions that, when executed by the one or more processors, cause the one or more processors to:
    determine the data of interest during the execution of the model.

29. The non-transitory computer-readable storage medium of claim 27, where the one or more instructions to determine the data of interest include:
one or more instructions that, when executed by the one or more processors, cause the one or more processors to:
    determine the data of interest prior to the execution of the model.

30. The non-transitory computer-readable storage medium of claim 27, where the one or more instructions to determine the data of interest include:
one or more instructions that, when executed by the one or more processors, cause the one or more processors to:
    receive, during the execution of the model and via the graphical modeling environment, a selection of a model element included in the model, and
    determine the data of interest based on the selection.

31. The non-transitory computer-readable storage medium of claim 27, where the instructions further comprise:
one or more instructions that, when executed by the one or more processors, cause the one or more processors to:
    express the remote monitoring tool using block diagram primitives.

32. The non-transitory computer-readable storage medium of claim 27, where the instructions further comprise:
one or more instructions that, when executed by the one or more processors, cause the one or more processors to:
    express the remote monitoring tool using textual programming primitives.

33. The non-transitory computer-readable storage medium of claim 27, where the model includes a block; and
where the one or more instructions to determine the data of interest include:
one or more instructions that, when executed by the one or more processors, cause the one or more processors to:
    receive information identifying the block, and
    determine the data of interest based on the information identifying the block.

34. The non-transitory computer-readable storage medium of claim 27, wherein where the model includes a signal line and,
where the one or more instructions to determine the data of interest include:
one or more instructions that, when executed by the one or more processors, cause the one or more processors to:
    receive information identifying the signal line, and
    determine the data of interest based on the information identifying the signal line.

35. A method comprising:
determining data of interest associated with a model of a dynamic system,
    the model being provided in a graphical modeling environment, and
    the determining the data of interest being performed by one or more processors of a device;
invoking a remote monitoring tool synchronously with an execution of the model execution in the graphical modeling environment,
    the invoking the remote monitoring tool being performed by the one or more processors,
    the remote monitoring tool being connected to the model via an event-listener application programming interface,
        the event-listener application programming interface enforcing a synchronization of data being transferred between the model and the remote monitoring tool using one or more of:
            a pre-execution callback,
            a post-execution callback, or
            an occurrence of an event associated with the data of interest, and
    the remote monitoring tool providing a user interface that enables a user to:
        track and select one or more elements associated with an operation of the remote monitoring tool, and
        identify configuration information for configuring the operation of the remote monitoring tool,
            the configuration information being stored in a model associated with the remote monitoring tool;
executing the remote monitoring tool, during the execution of the model, to cause the remote monitoring tool to non-invasively monitor the data of interest based on the one or more of the pre-execution callback, the post-execution callback or the occurrence of the event, the executing the remote monitoring tool being performed by the one or more processors,
performing a dynamic range assessment based on the data of interest,
the performing the dynamic range assessment being performed by the one or more processors;
determining, based on the dynamic range assessment, a dynamic range associated with the data of interest,
the dynamic range including a ratio of a maximum data value to a minimum data value, and
the determining the dynamic range being performed by the one or more processors;
providing the result of the dynamic range assessment for display during the execution of the model,
the providing the result for display being performed by the one or more processors; and
modifying the model based on the result of the dynamic range assessment,
the modifying the model being performed by the one or more processors.

\* \* \* \* \*